United States Patent [19]

Shoji et al.

[11] Patent Number: 4,754,344

[45] Date of Patent: Jun. 28, 1988

[54] METHOD AND APPARATUS FOR FORMATTING MAGNETIC DISKS WITH USE OF HOST EQUIPMENT PROGRAMMED FOR SMALLER CAPACITY MAGNETIC DISKS

[75] Inventors: Makoto Shoji, Fussa; Hiroshi Tsuyuguchi, Tokyo, both of Japan

[73] Assignee: Teac Corporation, Tokyo, Japan

[21] Appl. No.: 945,290

[22] Filed: Dec. 22, 1986

[30] Foreign Application Priority Data

Dec. 24, 1985 [JP] Japan .................................. 60-289219

[51] Int. Cl.$^4$ .............................................. G11B 5/09
[52] U.S. Cl. ...................................................... 360/48
[58] Field of Search ............................ 360/48, 51, 39

[56] References Cited

U.S. PATENT DOCUMENTS 4,432,025  2/1984  Grogan ................................. 360/48
4,651,238  3/1987  Ishikura ................................ 360/48

Primary Examiner—Vincent P. Canney
Attorney, Agent, or Firm—Woodcock Washburn Kurtz Mackiewicz & Norris

[57] ABSTRACT

A double capacity adapter circuit is connected between host equipment and one or more magnetic disk drives in order to adapt the host equipment, which has been programmed for use with relatively small capacity magnetic disks, for use with double capacity magnetic disks in the disk drives coupled thereto. As originally programmed, the host equipment formats one side of a small capacity magnetic disk with first format data in response to an index pulse from the associated disk drive, and the other side of the small capacity magnetic disk with second format data in response to another index pulse. In order to format the double capacity magnetic disks with the same program, the adapter circuit delays the index pulses by a time corresponding to half a revolution of the magnetic disk, thereby producing pseudo index pulses. The adapter circuit further enables the host equipment to cause each double capacity magnetic disk drive to write the first format data on a first half of one side of the double capacity magnetic disk in response to one true index pulse, and the second format data on a second half of the same side in response to one pseudo index pulse. Thus, for example, the complete format data that have been programmed to be written on four double sided small capacity disks can be written on two double sided double capacity disks.

9 Claims, 5 Drawing Sheets

FORMATTING OF SIDE "0" OF FIRST LARGE CAPACITY DISK

FORMATTING OF SIDE "1" OF FIRST LARGE CAPACITY DISK

FORMAT WRITTEN OF EITHER SIDE OF EITHER LARGE CAPACITY DISK

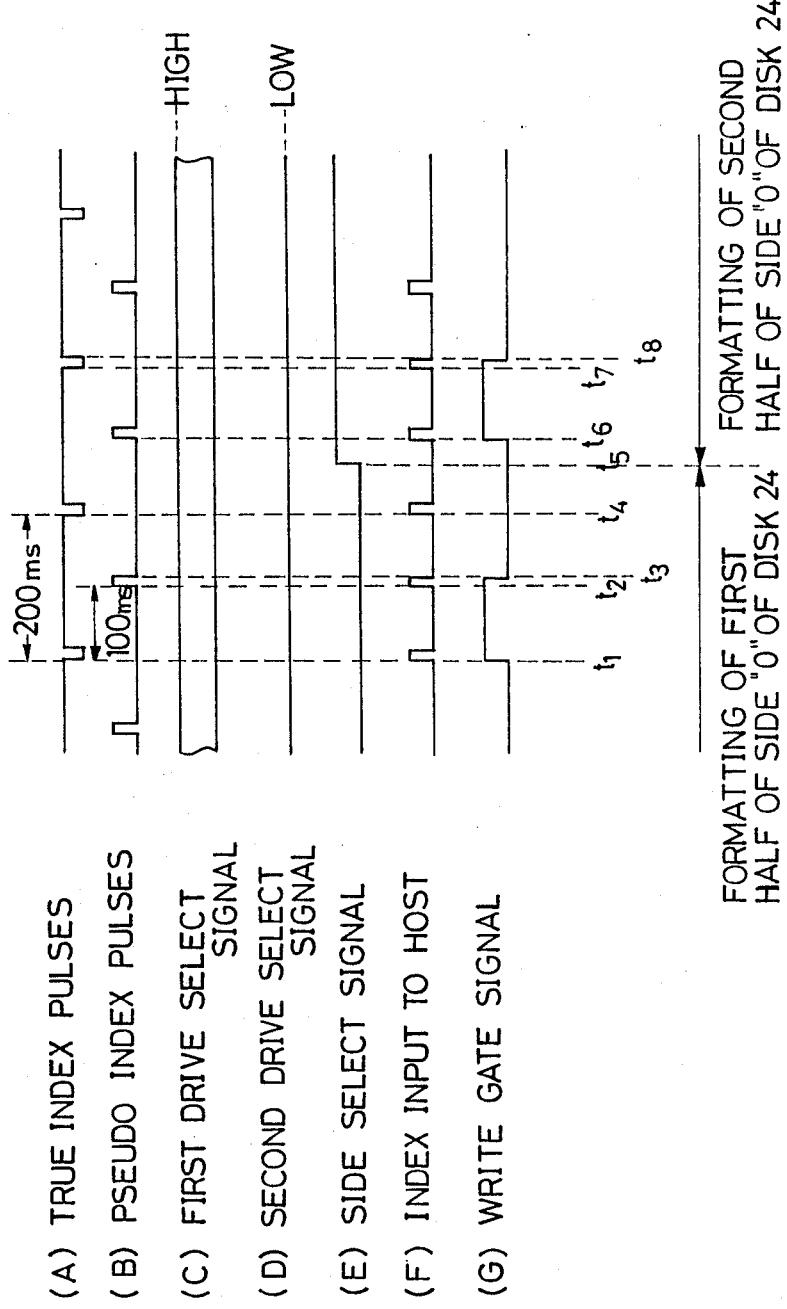

METHOD AND APPARATUS FOR FORMATTING MAGNETIC DISKS WITH USE OF HOST EQUIPMENT PROGRAMMED FOR SMALLER CAPACITY MAGNETIC DISKS

BACKGROUND OF THE INVENTION

Our invention relates generally to the formatting or initialization (i.e. writing of track format data preparatory to use) of magnetic disks such as those commonly known as floppy disks. More specifically, our invention pertains to a method of, and apparatus for, formatting magnetic disks of relatively large data storage capacity (high bit density) with use of host equipment that has been programmed for formatting magnetic disks of smaller capacity.

Floppy disks are now commercially offered in various sizes, with different storage capacities and track formats. They are mounted in floppy disk drives (FDDs) of matching constructions and operating speeds for the transfer of data therewith. Normally, to make up a self contained data processing system, a required number of such FDDs are daisy chained to an FDD controller which in turn is coupled to a central processor unit (CPU). The FDD controller and CPU constitute, in combination, host equipment to which the FDDs are subordinate, the transfer of data to and from the floppy disks in the FDDs being effected under the control of the host equipment. FDD controllers are available on the market in the form of large scale integrated (LSI) circuits chips, examples being those trademarked "FD 1791" and a related series of products manufactured by Western Digital Corp., and "μPD 765" manufactured by Nippon Electric Corp.

As is well known, each floppy disk just purchased and loaded in the matching FDD must be formatted or initialized preparatory to the commencement of normal data transfer operation. Usually, the host equipment is programmed to format floppy disks of only the particular data capacity intended for use with the FDDs under the control of the host equipment.

Take, for example, floppy disks having a standard format of 16 sectors per track, and those having another standard format of 32 sectors per track. The data storage capacity of the former is half that of the latter. We will call the floppy disks of the first mentioned and comparable formats the small (or smaller) capacity floppy (or magnetic) disks, and those of the second recited and comparable formats the large (or larger) capacity floppy (or magnetic) disks. The small capacity floppy disks are intended for use with matching small capacity FDDs (SCFDDs), and the large capacity floppy disks for use with matching large capacity FDDs (LCFDDs). The LCFDDs operate at a data transfer speed twice that of the SCFDDs as the bit density of the large capacity floppy disks is twice that of the small capacity floppy disks.

Heretofore, the formatting of the small and large capacity floppy disks has required host equipment programmed exclusively for either type of record media. FDD controllers programmed for small capacity floppy disks are now available at reduced costs because of the more widespread acceptance of such small capacity floppy disks and associated SCFDDs. As far as we know, however, the low cost FDD controllers programmed for small capacity floppy disks have heretofore been incompatible with LCFDDs by reason of the difference in format between the small and large capacity floppy disks. In the light of the definite advantage of greater storage capacity possessed by large capacity floppy disks, we believe that this seeming incompatibility must be overcome in order to make them, together with the associated LCFDDs, more readily acceptable to prospective users.

SUMMARY OF THE INVENTION

We have hereby invented how to adapt host equipment that has been programmed for small capacity magnetic disks and SCFDDs, for use with large capacity magnetic disks and LCFDDs, too, despite the difference in track format between the small and large capacity magnetic disks.

Stated broadly in one aspect thereof, our invention provides a method of formatting one side of a larger capacity magnetic disk with use of the same program as for formatting both sides of a smaller capacity magnetic disk whose data storage capacity per side is half that of the larger capacity magnetic disk. The method dictates the provision of host means programmed for formatting, at a first data transfer speed, one side of the smaller capacity magnetic disk with first format data in response to an incoming index pulse, and the other side of the smaller capacity magnetic disk with second format data in response to another incoming index pulse. A disk drive is also provided for data transfer with the larger capacity magnetic disk at a second data transfer speed which is twice as high as the first data transfer speed, with the host means being adapted for controlling the data transfer between the disk drive and the larger capacity magnetic disk at the second data transfer speed. The disk drive is conventionally provided with means for generating, for delivery to the host means, a series of true index pulses indicative of the angular position of the larger capacity magnetic disk, the true index pulses being generated at a rate of one with each revolution of the larger capacity magnetic disk.

As the larger capacity magnetic disk is set into rotation in the disk drive, with the consequent production of the true index pulses, the method of our invention dictates the delivery of a series of pseudo index pulses to the host equipment along with the true index pulses generated by the disk drive. The pseudo index pulses have the same repetition frequency as the true index pulses but are spaced in time from the true index pulses to an extent corresponding to half a revolution of the larger capacity magnetic disk. The true and pseudo index pulses are interleaved and fed to a common input of the host means. In response to one true index pulse the host means causes the drive circuit to write the first format data on a first half of one side of the larger capacity magnetic disk and, in response to one pseudo index pulse, causes the drive circuit to write the second format data on a second half of the same side of the magnetic disk.

It should be noted that the host means has initially been programmed for formatting both sides of a double sided smaller capacity magnetic disk at the first data transfer speed. For formatting one side of a larger capacity magnetic disk with the same program, the host means may be internally clocked to control the formatting operation of the larger capacity magnetic disk drive at the second data transfer speed twice as high as the first data transfer speed. Further, as the larger capacity magnetic disk is set into rotation for formatting, one true and one pseudo index pulses are fed to the host means with each revolution of the disk. It is therefore possible to write on one side of the larger capacity magnetic disk the format data that have been programmed to be written on both sides of the smaller capacity magnetic disk. The software of the host means needs no alteration at all.

As the format data that have been programmed to be written on both sides of the smaller capacity magnetic disk can be written as above on one side of the larger capacity magnetic disk by our invention, it is self evident that the format data that have been programmed to be written on two double sided smaller capacity magnetic disks can be written on one double sided larger capacity magnetic disks. Similarly, as in the preferred embodiment of our invention disclosed herein, the format data that have been programmed to be written on four double sided smaller capacity magnetic disks can be written on two double sided larger capacity magnetic disks.

Another aspect of our invention concerns a data transfer system for use in the practice of the above summarized method. Stated in its simplest form, the data transfer system comprises host means of largely conventional hardware and exactly conventional software, at least one disk drive for data transfer with the larger capacity magnetic disk at the second data transfer speed, and a double capacity adapter circuit connected between the host means and the disk drive. The double capacity adapter circuit includes means for generating the pseudo index pulses in the timed relation to the true index pulses generated by the standard index sensor of the disk drive. Preferably, the pseudo index pulses may be derived from the true index pulses merely by imparting a prescribed time delay to the latter, so that the pseudo index pulse generator means can be a simple delay circuit coupled to the index sensor.

The conventional hardware of the host means needs a very slight modification with respect to its clock since, for formatting the larger capacity magnetic disk, the clock frequency must be twice as high as for formatting the smaller capacity magnetic disk. The FDD controller chip conventionally incorporated in the host means is clocked externally. The external clock of the conventional host hardware may therefore be simply replaced by a double frequency clock to adapt the host hardware for use with the larger capacity magnetic disk. This modification of the host hardware, as well as the addition of the double capacity adapter circuit, is so simple and easy that the costs of such alterations are negligible in comparison with the costs required for the development of new host hardware and software devoted exclusively to large capacity magnetic disks.

The above and other features and advantages of our invention and the manner of realizing them will become more apparent, and the invention itself will best be understood, from a study of the following description and appended claims, with reference had to the attached drawings showing the preferred embodiment of our invention.

BRIEF DESCRIPTION OF THE DRAWINGS

FIG. 7, consisting of (A)–(G), is a diagram showing in proper time relation the waveforms appearing in the various parts of the FIG. 1 system by way of explanation of its operation.

DESCRIPTION OF THE PREFERRED EMBODIMENT

General

Figure 1:
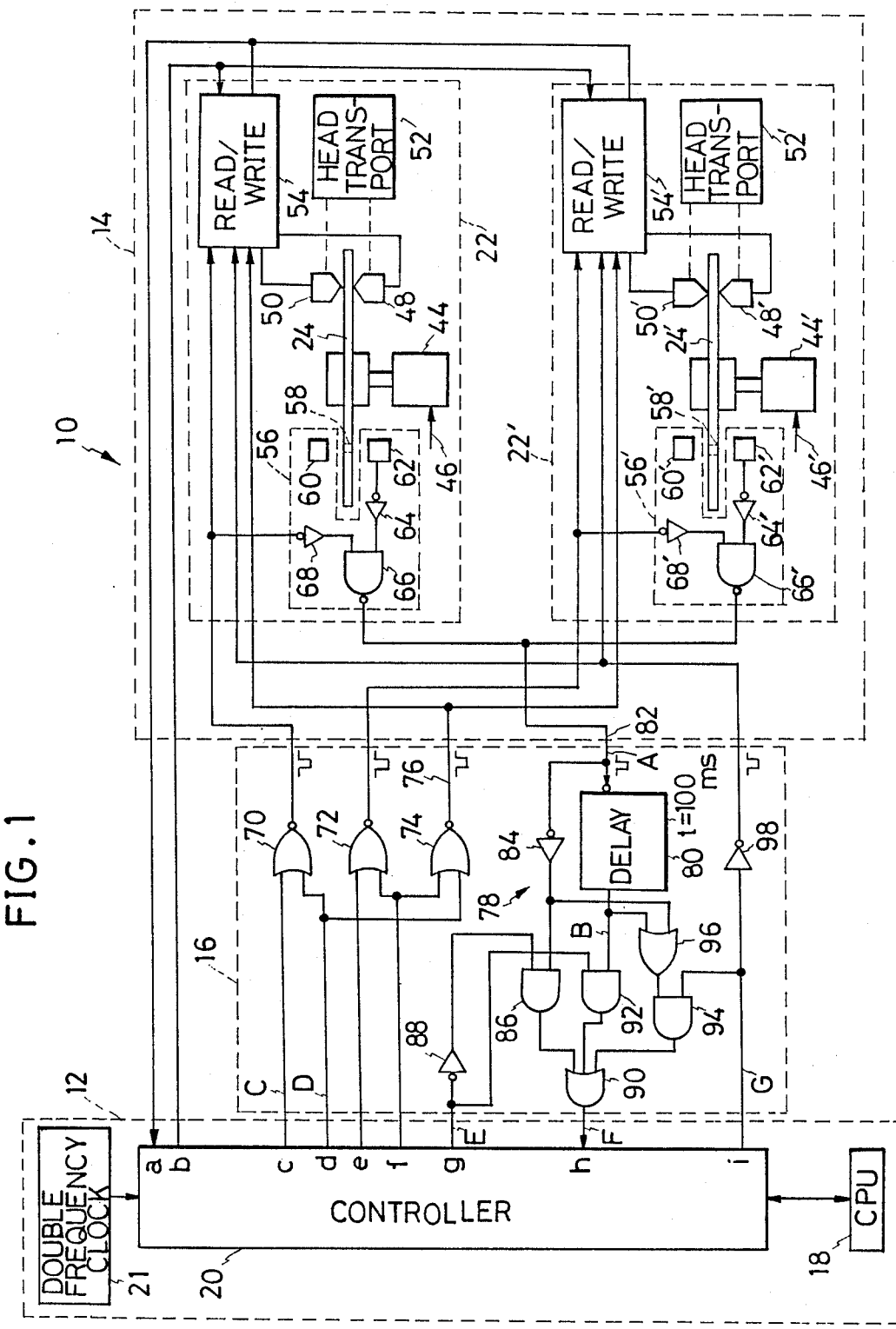
FIG. 1 is a block diagram of a data processing system constructed in accordance with the novel concepts of our invention, with the data processing system including two large capacity floppy disk drives which are daisy chained to host equipment.

We will now describe our invention in detail as adapted for the data processing system of FIG. 1. Generally designated 10, the illustrated data processing system comprises host equipment 12, terminal equipment 14, and a double capacity adapter circuit 16. The host equipment 12 can be of largely conventional design comprising a CPU 18 and an FDD controller 20 with an external clock 21. The terminal equipment 14 is herein shown to comprise two LCFDDs 22 and 22' which are daisy chained to the host equipment 12 via the double capacity adapter circuit 16. The LCFDDs 22 and 22' have loaded therein large capacity floppy disks 24 and 24', respectively, of the double sided type. Each large capacity floppy disk is to be formatted into 32 sectors per track in this particular embodiment. We understand, therefore, that the LCFDDs 22 and 22' are conventionally constructed for data transfer with the large capacity floppy disks 24 and 24', respectively, at a matching rate of 500 kilobits per second.

Figure 2:
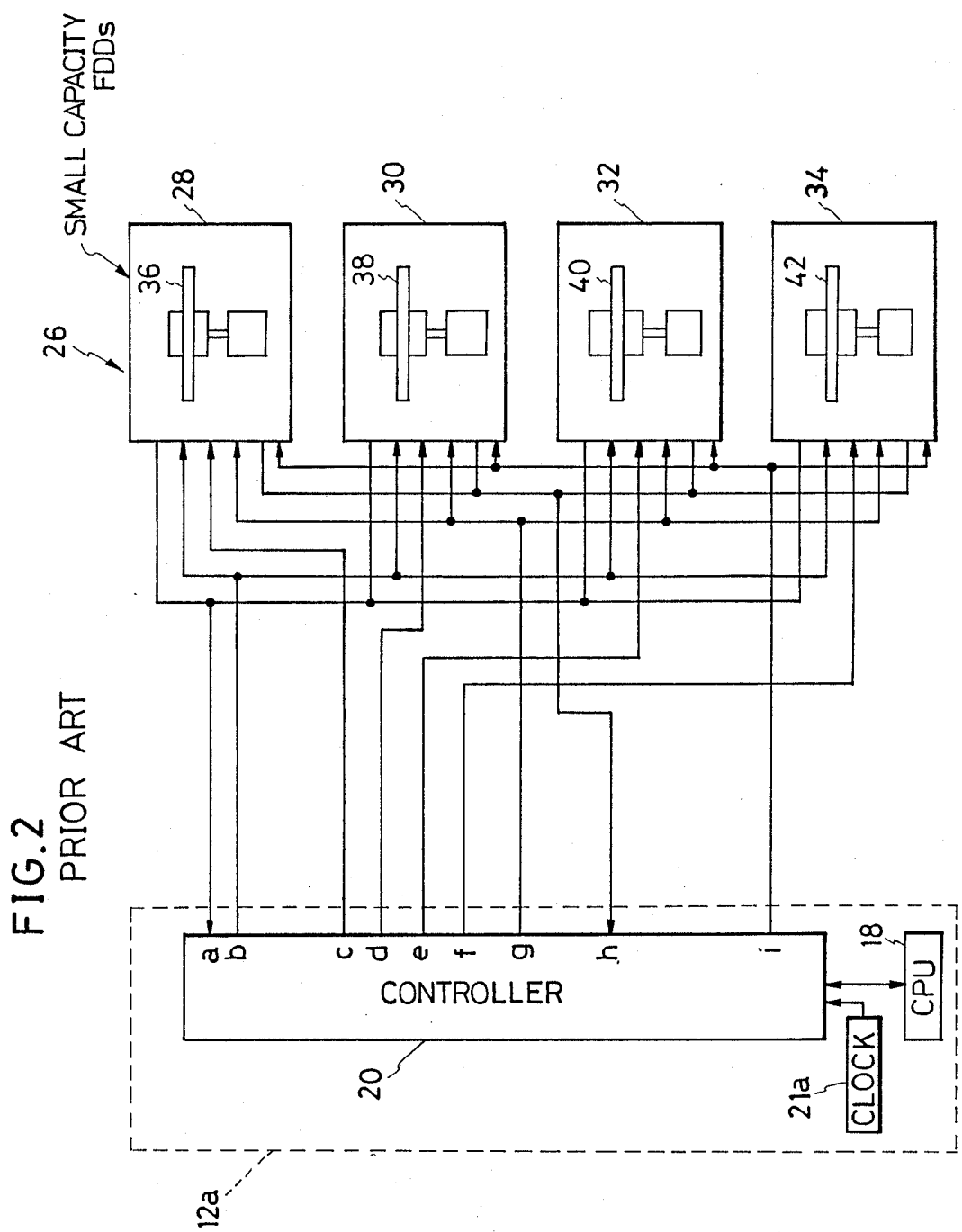
FIG. 2 is a block diagram of a prior art data processing system including four small capacity floppy disk drives which are daisy chained to host equipment having the same formatting program as the host equipment of FIG. 1, the total data storage capacity of this prior art system being equal to that of the inventive system of FIG. 1.

In FIG. 2 we have shown a prior art data processing system, generally labeled 26, that is equivalent to the FIG. 1 system 10 in terms of data storage capacity. The prior art system 26 comprises four SCFDDs 28, 30, 32 and 34 coupled in a daisy chain to the host equipment 12a. The SCFDDs 28, 30, 32 and 34 are shown together with small capacity floppy disks 36, 38, 40 and 42, respectively, of the double sided type mounted in position therein. Each small capacity floppy disk is to be formatted into 16 sectors per track by the host equipment 12. Accordingly, each large capacity floppy disk 24 or 24' of the FIG. 1 system 10 has a data storage capacity twice that of each small capacity floppy disk 36, 38, 40 or 42 of the FIG. 2 system 26. The total capacity of the two large capacity floppy disks 24 and 24' is therefore equal to that of the four small capacity floppy disks 36 through 42. The SCFDDs 28 through 34 are conventionally constructed for data transfer with these small capacity floppy disks 36 through 42 at a matching rate of 250 kilobits per second.

The host equipment 12a of the prior art data processing system 26 is akin, in both hardware and software, to the host equipment 12 of the inventive system 10 of FIG. 1 except for the external clock 21a of the FDD controller 20. Because of the difference in data transfer speed and storage capacity between the LCFDDs 22 and 22' of the inventive system 10 and the SCFDDs 28 through 34 of the prior art system 26, the clock frequency must be twice as high in the inventive system as in the prior art system. Merely by substituting the double frequency clock 21 for the clock 21a, our invention enables this known host equipment to format the large capacity floppy disks 24 and 24' of the inventive system 10 with the same program as for the small capacity floppy disks 36 through 42 of the prior art system 26.

The formatting of each large capacity floppy disk into 32 sectors per track with the program for formatting each small capacity floppy disk into 16 sectors per track is possible by writing on one side of each large capacity floppy disk the format data that have been intended to be written on both sides of each small capacity floppy disk. We have interposed the double capacity adapter circuit 16 between host equipment 12 and terminal equipment 14 in order to make possible such formatting of the large capacity floppy disks 24 and 24'.

The following is a more extensive discussion, under the respective headings, of the host equipment 14, the LCFDDs 22 and 22', and the double capacity adapter circuit 16, in that order, followed by the explanation of the track format to be written on each large capacity floppy disk 24 or 24' and, subsequently, by the operational description of the FIG. 1 system.

Host Equipment

The host equipment 12 is conventionally programmed for formatting the small capacity floppy disks 36 through 42 of the SCFDDs 28 through 34 of the prior art system 26 of FIG. 2, the same program being used for formatting the large capacity floppy disks 24 and 24' of the HDFDDs 22 and 22' of the inventive system 10 of FIG. 1 via the double capacity adapter circuit 16. Thus, contrary to the showing of FIG. 1, the hardware of the host equipment 12 may be constructed for use both with the SCFDDs of FIG. 2 and, via the double capacity adapter circuit 16, with the LCFDDs of FIG. 1. All that is necessary for adapting the host hardware for these two applications is to provide the FDD controller 20 with means for generating clock signals of two different repetition frequencies, one clock signal having a frequency twice that of the other, for the different data transfer speeds (250 and 500 kilobits per second) of the SCFDDs and LCFDDs. Of course, the FDD controller 20 may be provided with only the double frequency clock 21, as in FIG. 1, if the host equipment is intended for use with only the LCFDDs as in the FIG. 1 system 10.

The FDD controller 20, which in practice can be any of the commercially available LSI circuit chips set forth previously, has a multiplicity of terminals for the transmission and reception of interface signals to and from the HDFDDs 22 and 22', either directly or via the double capacity adapter circuit 16. In FIG. 1, as well as in FIG. 2, we have shown only those of the controller terminals which are necessary for a full understanding of our invention. These pertinent controller terminals are:

1. Read data input a for the reception of data that has been read by the LCFDDs 22 and 22' from the large capacity floppy disks 24 and 24'.

2. Write data output b for the delivery of data (including format data) to be written on the large capacity floppy disks 24 and 24'.

3. First drive select output c for the delivery of a first drive select signal which is used for selecting the first SCFDD 28 in the prior art system 26 but which in the inventive system 10 is used for selecting Side 0 (bottom side) of the large capacity floppy disk 24 of the first LCFDD 22.

4. Second drive select output d for the delivery of a second drive select signal which is used for selecting the second SCFDD 30 in the prior art system 26 but which in the inventive system 10 is used for selecting Side 1 (top side) of the large capacity floppy disk 24 of the first LCFDD 22.

5. Third drive select output e for the delivery of a third drive select signal which is used for selecting the third SCFDD 32 in the prior art system 26 but which in the inventive system 10 is used for selecting Side 0 of the large capacity floppy disk 24' of the second LCFDD 22'.

6. Fouth drive select output f for the delivery of a fourth drive select signal which is used for selecting the fourth SCFDD 34 in the prior art system 26 but which in the inventive system 10 is used for selecting Side 1 of the large capacity floppy disk 24' of the second LCFDD 22'.

7. Side select output g for the delivery of a side select signal which serves for selecting either side of each small capacity floppy disk 36, 38, 40 or 42 in the prior art system 26 but which in the inventive system 10 is used for selecting either half of each side of each large capacity floppy disk 24 or 24', as will become apparent as the description proceeds.

8. Index input h for the reception of both true and pseudo index pulses from the LCFDDs 22 and 22' via the double capacity adapter circuit 16, also as will become understandable subsequently.

9. Write gate output i for the delivery of a write gate signal to the LCFDDs 22 and 22' in order to enable them to write on the large capacity floppy disks 24 and 24' the data supplied from the write data output b of the FDD controller 20.

We employed the conventional terminology for naming the various terminals a through i of the FDD controller 20 and the associated signals since such terminology is familiar to the specialists. Actually, however, some of the terminals perform functions in the inventive system 10 that are different from those performed by the corresponding controller terminals of the prior art system 26, because the format data to be written on both sides of each low capacity floppy disk in the prior art system are written as aforesaid on one side of each large capacity floppy disk in the inventive system.

Large Capacity Floppy Disk Drives

The two daisy chained LCFDDs 22 and 22' of the inventive system 10 are similar in construction to the SCFDDs 28 through 34 of the prior art system 26 except that the former operate at the higher data transfer rate of 500 kilobits per second. We have said that the storage capacity of each LCFDD is twice that of each SCFDD. In this particular embodiment the storage capacity of each LCFDD is two megabytes whereas that of each SCFDD is one megabyte.

Since the two LCFDDs 22 and 22' are of identical construction, we will describe only the first LCFDD 22 in detail, it being understood that the same description applies to the second LCFDD 22'. We will identify the various parts of the second LCFDD 22' merely by priming the reference numerals used to denote the corresponding parts of the first LCFDD 22.

The representative first LCFDD 22 is shown to have the large capacity floppy disk 24 mounted in position therein to be driven by an electric disk drive motor 44. This motor is set into and out of rotation as dictated by a drive signal fed over a line 46. A first or lower magnetic read/write head 48 is arranged for data transfer contact with Side 0 of the floppy disk 24, whereas a second or upper magnetic read/write head 50 is arranged for data transfer contact with Side 1 of the floppy disk. Both magnetic heads 48 and 50 are mechanically coupled to a common head transport or positioning mechanism 52 comprising a head positioning motor of the electric bidirectional stepping type, not shown, thereby to be transported radially of the floppy disk 24 for accessing the concentric circular tracks on its opposite surfaces.

Electrically, the magnetic heads 48 and 50 are both connected to a read/write circuit 54 whose function it is to control the writing and reading of data, including format data, on and from the opposite sides of the floppy disk 24. The read/write circuit 54 is connected directly to both read data input a and write data output b of the host controller 20, besides being coupled to some other terminals of the host controller via the double capacity adapter circuit 16 as will be explained presently.

At 56 is seen an index sensor circuit for optically detecting an index hole 58 formed eccentrically in the floppy disk 24 in a preassigned angular position thereon and for producing electric index pulses representative of the angular position of the floppy disk. The index sensor circuit 56 comprises a light source 60 such as a light emitting diode and a photoreceptor 62 such as a phototransistor disposed on the opposite sides of the floppy disk 24 and across the path of the index hole 58. An index pulse is to be generated each time the photoreceptor 62 is irradiated by the light source 60 via the index hole 58. The photoreceptor 62 is electrically coupled via a NOT circuit 64 to one of the two inputs of a NAND gate 66, the other input of which is coupled to the adapter circuit 16 via a NOT circuit 68.

It will be seen that the NAND gates 66 and 66' of both LCFDDs 22 and 22' have their outputs interconnected and coupled to the index input h of the host controller 20 via the double capacity adapter circuit 16. Each NAND gate 66 or 66' permits the delivery of the index pulses to the host controller 20 only when the associated LCFDD 22 or 22' is chosen for data transfer with the associated large capacity floppy disk 24 or 24' by the drive select signals from the host controller.

Double Capacity Adapter Circuit

As shown also in FIG. 1, the double capacity adapter circuit 16 includes a first NOR gate 70 having its two inputs coupled respectively to the first and second drive select outputs c and d of the host controller 20, and its output to the read/write circuit 54, and to the NOT circuit 68 of the index sensor circuit 56, of the first LCFDD 22. A second NOR gate 72 has its two inputs coupled respectively to the third and fourth drive select outputs e and f of the host controller 20, and its output to the read/write circuit 54', and to the NOT circuit 68' of the index sensor circuit 56', of the second LCFDD 22'.

Because of the noted difference in format between the large capacity floppy disks of the inventive system 10 and the small capacity floppy disks of the prior art system 26, the side select output g of the host controller 20 is not coupled to either of the LCFDDs 22 and 22'. Instead, we have employed in the double capacity adapter circuit 16 a third NOR gate 74 having its two inputs coupled respectively to the second and fourth drive select outputs d and f of the host controller 20. The output of the third NOR gate 74 is coupled to the standard side select input line 76 of the LCFDDs 22 and 22', which line 76 leads to the read/write circuit 54 and 54' of both LCFDDs. As will be seen by referring to FIG. 2, the side select output g of the host controller 20 has been coupled to the read/write circuits of the SCFDDs 28 through 34.

The double capacity adapter circuit 16 further includes means, generally indicated at 78, for generating "pseudo" index pulses for delivery to the host equipment 12 along with the "true" index pulses generated by the index sensor circuits 56 and 56' of the LCFDDs 22 and 22'. Actually, the generator means 78 derive the pseudo index pulses from the true index pulses so as to be in definite time relation thereto; that is, the pseudo index pulses are spaced in time from the true index pulses to an extent corresponding to half a revolution of the large capacity magnetic disk 24 or 24'. The true and pseudo index pulses are supplied in an alternating series to the index input h of the host controller 20. In response to these incoming true and pseudo index pulses the host equipment 12 formats the large capacity floppy disks 24 and 24' in a manner yet to be described.

A principal component of the pseudo index pulse generator means 78 is a delay circuit 80 having its input connected to the index signal output line 82 leading to the index sensor circuits 56 and 56' of both LCFDDs 22 and 22'. The time delay t offered by the delay circuit 80 is one half (100 milliseconds) of the time (200 milliseconds) required for each large capacity floppy disk 24 or 24' to complete one revolution. Each pseudo index pulse is thus generated at the moment each large capacity floppy disk is angularly displaced half a revolution from the moment one true index pulse is generated by the associated index sensor circuit.

The pseudo index pulse generator means 78 additionally include various gates, set forth hereinbelow, for supplying the true and pseudo index pulses to the host equipment 12 in a manner well calculated for formatting the two double sided large capacity floppy disks 24 and 24' loaded in the daisy chained LCFDDs 22 and 22'.

The index signal output line 82 is coupled not only to the delay circuit 80 but also, via a NOT circuit 84, to an AND gate 86. To another input of this AND gate is connected the side select output g of the host controller 20 via a NOT circuit 88. The output of the AND gate 86 is coupled to one of the three inputs of an OR gate 90 and thence to the index input h of the host controller 20. It will be seen, then, that the AND gate 86 functions to permit the supply of true index pulses to the host controller 20 when the side select signal is low, specifying Side 0 (bottom side) of the large capacity floppy disks 24 and 24'.

Connected to the second input of the three inputs OR gate 90 is a second AND gate 92 having a first input coupled directly to the side select output g of the host controller 20 and a second input to the delay circuit 80. Thus the second AND gate 92 is effective to permit the passage therethrough of pseudo index pulses from the delay circuit 80 to the host controller 20 via the OR gate 90 when the side select signal is high, specifying Side 1 (top side) of the large capacity floppy disks 24 and 24'.

The third input of the OR gate 90 has connected thereto a third AND gate 94 having a first input couled to an OR gate 96 and a second input to the write gate output i of the host controller 20. The OR gate 96 has its two inputs coupled respectively to the delay circuit 80 and to the NOT circuit 84. The write gate output i is coupled to the read/write circuit 54 and 54' of both LCFDDs 22 and 22' via a NOT circuit 98. The write gate signal goes high for causing the LCFDDs 22 and 22' to write the data supplied from the write data output b of the host controller 20. When this write gate signal is high, the third AND gate 94 permits both true and pseudo index pulses to pass therethrough on toward the index input h of the host controller 20.

Format to be Written on Large Capacity Floppy Disks

The host equipment 12 of the inventive data transfer system 10 of FIG. 1 has originally been programmed as aforesaid for formatting both sides of each of the four small capacity floppy disks 36, 38, 40 and 42 as in the prior art system 26 of FIG. 2. Since this same host equipment 12 is used for formatting both sides of each of the two large capacity floppy disks 24 and 24' in accordance with our invention, the format data are to be written on these floppy disks in accordance with the following schemes in this particular embodiment:

1. The format data that have been programmed to be written on both sides of the small capacity floppy disk 36 of the first SCFDD 28 in the prior art system 26 are written on Side 0 of the large capacity floppy disk 24 of the first LCFDD 22 in the inventive system 10.

2. The format data that have been programmed to be written on both sides of the small capacity floppy disk 38 of the second SCFDD 30 in the prior art system 26 are written on Side 1 of the large capacity floppy disk 24 of the first LCFDD 22 in the inventive system 10.

3. The format data that have been programmed to be written on both sides of the small capacity floppy disk 40 of the third SCFDD 32 in the prior art system 26 are written on Side 0 of the large capacity floppy disk 24' of the second LCFDD 22' in the inventive system 10.

4. The format data that have been programmed to be written on both sides of the small capacity floppy disk 42 of the fourth SCFDD 34 in the prior art system 26 are written on Side 1 of the large capacity floppy disk 24' of the second LCFDD 22' in the inventive system 10.

Figure 3:
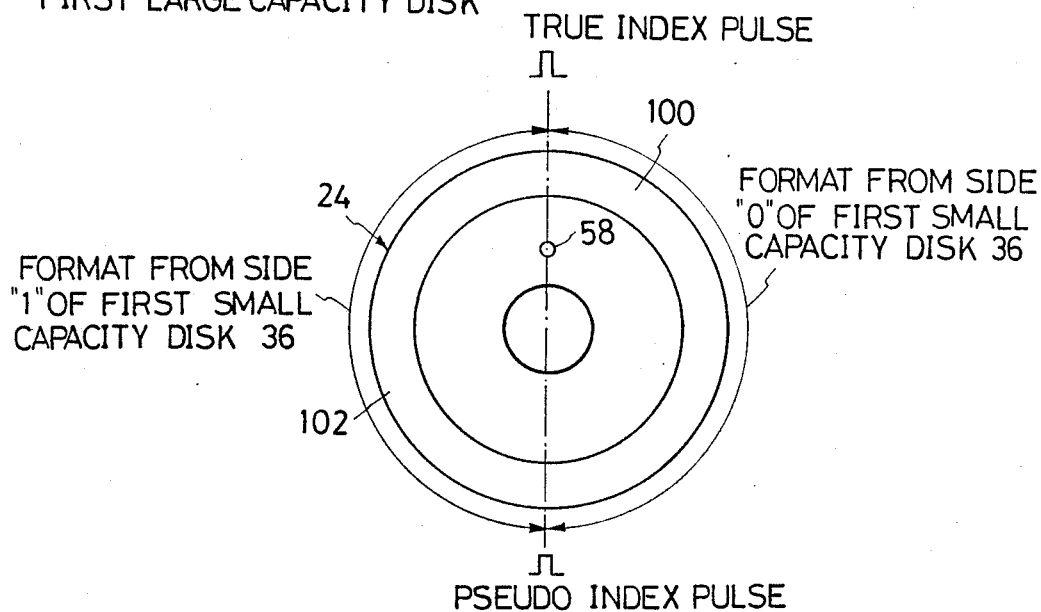
FIG. 3 is a plan view of one of the large capacity floppy disks in the data transfer system of FIG. 1, the view being explanatory of how one side of the disk is formatted by the FIG. 1 system with use of the program for the small capacity floppy disks of FIG. 2.

We have illustrated in FIG. 3 how Side 0 of the large capacity floppy disk 24 of the first LCFDD 22 is formatted in accordance with Scheme 1 above. The large capacity floppy disk 24 has the index hole at 58. In response to a true index pulse supplied from the index sensor circuit 56 of the first LCFDD 22 via the double capacity adapter circuit 16 upon detection of the index hole 58, the host equipment 12 causes the first LCFDD 22 to write on a first half 100 of Side 0 of the large capacity floppy disk 24 the format data that have been programmed to be written on Side 0 of the first small capacity floppy disk 36 in the prior art system 26.

The mentioned "first half" is defined as that surface region of either side of each large capacity floppy disk which extends 180 degrees in a clockwise direction, as seen in FIG. 3, from the index hole 58. Redefined in terms of time, the "first half" is from the moment one true index pulse is generated to the moment one pseudo index pulse is generated immediately thereafter.

When the large capacity floppy disk 24 rotates half a revolution following the detection of the index hole 58 by the index sensor circuit 56, the pseudo index pulse generator means 78 of the double capacity adapter circuit 16 will deliver a pseudo index pulse to the host equipment 12. Thereupon the host equipment will respond by causing the LCFDD 22 to write on a second half 102 of Side 0 of the floppy disk 24 the format data that have been programmed to be written on Side 1 of the first small capacity floppy disk 36 in the prior art system 26.

The "second half" is defined as that surface region of either side of each large capacity floppy disk which extends 180 degrees in a counterclockwise direction, as seen in FIG. 3, from the index hole 58. Again redefined in terms of time, the "second half" is from the moment one pseudo index pulse is generated to the moment one true index pulse is generated subsequently.

Figure 4:
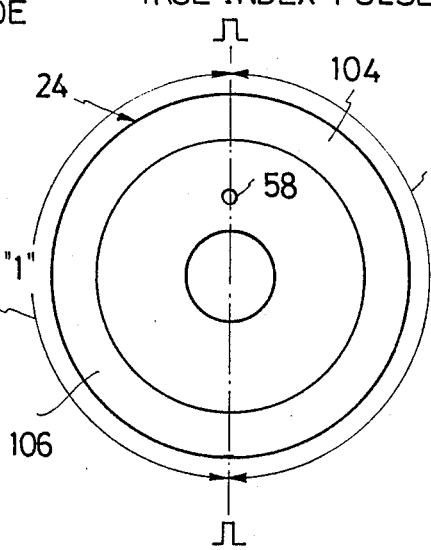
FIG. 4 is a view similar to FIG. 3 but explanatory of how the other side of the disk is formatted.

FIG. 4 is explanatory of how Side 1 of the large capacity floppy disk 24 of the first LCFDD 22 is formatted in accordance with Scheme 2 above. The host equipment 12 responds to one true, and one pseudo, index pulse for formatting Side 1 of the floppy disk 24, just as it does for formatting Side 0 of the floppy disk 24. The format data that have been programmed to be written on Side 0 of the second small capacity floppy disk 38 in the prior art system 26 are written on a first half 104, defined above, of Side 1 of the large capacity floppy disk 24 in the inventive system 10. The format data that have been programmed to be written on Side 1 of the second small capacity floppy disk 38 in the prior art system 26 are written on a second half 106, also defined above, of Side 1 of the large capacity floppy disk 24 in the inventive system 10.

It is self evident from the foregoing description of FIGS. 3 and 4 how the opposite sides of the large capacity floppy disk 24' of the second LCFDD 22' are formatted in accordance with Schemes 3 and 4.

Figure 5:
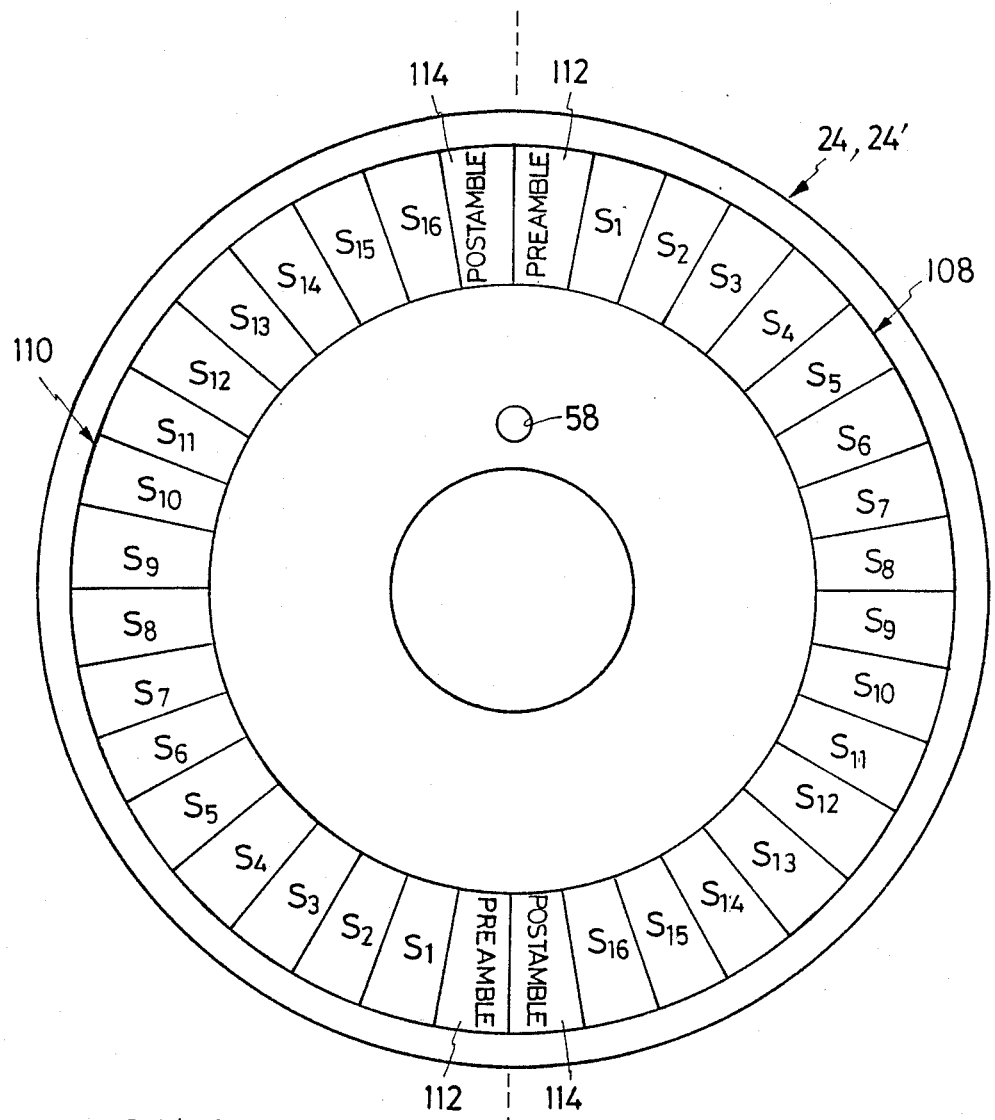
FIG. 5 is an enlarged plan view of each large capacity floppy disk in the data transfer system of FIG. 1, the view showing in more detail the format written on either side of the disk by the FIG. 1 system.

FIG. 5 is a more detailed illustration of the format on each side of each of the large capacity floppy disks 24 and 24'. The large capacity floppy disk format is composed of a first section 108 which is written on the first half of the floppy disk but which in the prior art system 26 is to be written on one side of each small capacity floppy disk, and a second section 110 which is written on the second half of the floppy disk but which in the prior art system 26 is to be written on the other side of each small capacity floppy disk. Each of the format sections 108 and 110 are shown to be of the commercially accepted IBM format, with each of the concentric circular tracks divided into a series of 16 data sectors S1 through S16, and a preamble sector 112 and a postamble sector 114 at the beginning and end, respectively, of the data sectors. Accordingly, the preamble sector 112 of the first format section 108 immediately follows the postamble sector 114 of the second format section 110, and the postamble sector 114 of the first format section 108 immidiately precedes the preamble sector 112 of the second format section 110.

Figure 6:
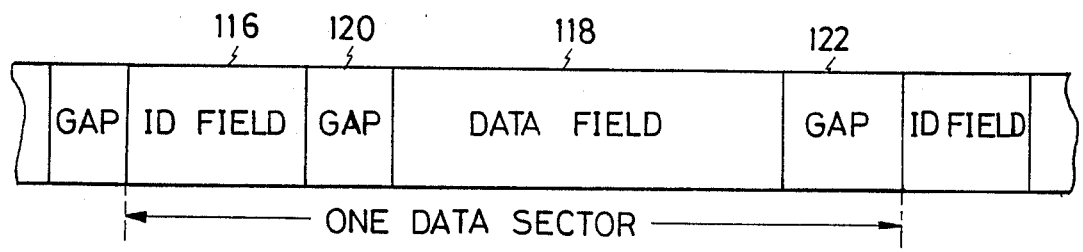
FIG. 6 is a diagram explanatory of the makeup of each data sector of the format written on the large capacity floppy disk of FIG. 5.

As indicated in FIG. 6, each of the data sectors S1 through S16 includes an identification (ID) field 116 containing information representative of the beginning of a sector and of its address, and a data field 118 for containing data to be read and/or written by the associated LCFDD 22 or 22'. A gap or blank 120 is interposed between ID field 116 and data field 118, and another gap 122 is provided after the data field, by way of protection of the recorded data against fluctuations in the rotary speed of the disk, dimensional or manufacturing errors, timing errors, etc.

The ID field 116 of each data sector conventionally contains data representative of the disk side on which the sector lies. Since the first and second format section 108 and 110 were originally intended to be written on Side 0 and Side 1, respectively, of one of the small capacity floppy disks 36 through 42 in the prior art system 26, these two format sections contain different identifying data. Consequently, it is possible to distinguish between every two sectors of the same number coexisting on each side of the large capacity floppy disk 24 or 24' because they bear different identifying data representing the different disk sides on which they were intended to be written.

Operation

Having thus described the organization of the data transfer system 10 of FIG. 1 and the format to be initially written on each side of the large capacity floppy disks 24 and 24', we will now proceed to the operational description of the system 10. Basically, the two LCFDDs 22 and 22' of the FIG. 1 system 10 are similar in both construction and operation to the four SCFDDs 28 through 34 of the FIG. 2 prior art system 26 except for the speed of data transfer. Incorporating the double capacity adapter circuit 16, the FIG. 1 system 10 makes it possible to write on the two large capacity floppy disks 24 and 24' the complete format data that have been programmed on the host equipment 12 for writing on the four small capacity floppy disks 36 through 42 in the FIG. 2 system 26.

For the operational description of the FIG. 1 system we will refer to FIG. 7 which shows at (A) through (G) the waveforms appearing in the various parts of that system during the formatting of Side 0 of the first large capacity floppy disk 24. In FIG. 1 we have indicated by the same capitals A through G the parts where the corresponding waveforms of FIG. 7 appear, in order to expedite understanding. The waveforms of FIG. 7 are plotted on the assumption that the first large capacity floppy disk 24 has its Side 0 formatted in the order of the first half 100 and second half 102.

First, for formatting the first half 110 of Side 0 of the floppy disk 24, the first drive select signal from the host controller terminal c goes high, as at (C) in FIG. 7, whereas the side select signal from the host controller terminal g goes low, as at (E) in FIG. 7, both in accordance with the conventional formatting program for the small capacity floppy disks of FIG. 2. The high first drive select signal from the host controller terminal c makes the first NOR gate 70 of the double capacity adapter circuit 16 go low, resulting in the commencement of the operation of the first LCFDD 22. As the floppy disk 24 is set into rotation by the disk drive motor 44 at the prescribed constant speed of 200 milliseconds per revolution, the index sensor circuit 56 will start production of a series of true index pulses, which are negative as generated by the circuit 56, at constant time spacings of 200 milliseconds, at at (A) in FIG. 7.

Since the second, third and fourth drive select signals from the host controller terminals d, e and f are now all low, the output from the second NOR gate 72 is high, disabling the second LCFDD 22'. The output from the third NOR gate 74 is also high. This output from the third NOR gate is used in this data transfer system 10 as the side select signal in place of the conventional side select signal from the host controller terminal g. Fed over the line 76 to the first LCFDD 22, the high side select signal from the third NOR gate 74 enables the read/write circuit 54 for the writing of format data on Side 0 of the floppy disk 24 by the magnetic head 48.

It should be noted that the conventional side select signal from the host controller terminal g is now low, as at (E) in FIG. 7. This conventional side select signal is used in the inventive system 10 to determine the writing of format data on the first or second half of either side of each large capacity magnetic disk, as will become more understandable presently.

Generated by the index sensor circuit 56 at a rate of one with each revolution of the large capacity floppy disk 24, the true index pulses are fed to the delay circuit 80 of the double capacity adapter circuit 16 thereby to be delayed 100 milliseconds (half a revolution of the disk) and hence to provide pseudo index pulses shown at (B) in FIG. 7. Thus, as one true index pulse is generated at a moment t1, one corresponding pseudo index pulse is generated at a a moment t3, 100 milliseconds after the moment t1. Another true index pulse generated at a moment t4 is also delayed 100 milliseconds to provide another pseudo index pulse at a moment t6, and so forth.

As is conventional with this type of data processing system, the disk drive motors 44 and 44' of the LCFDDs 22 and 22' may both be set into rotation by the "motor on" signal from the unshown terminal of the host controller 20 even when, as in the present case, only the first LCFDD 22 is chosen for data transfer. Although true index pulses will be generated in both LCFDDs 22 and 22', the NAND gate 66' in the index sensor circuit 56' of the second LCFDD 22' will block the delivery of the true index pulses to the double capacity adapter circuit 16.

The true index pulses from the first LCFDD 22 are directed not only to the delay circuit 80 but also, via the NOT circuit 84, to the AND gate 86. The other input of the AND gate 86 is coupled to the side select output g of the host controller 20 via the NOT circuit 88. Since the side select signal is now low as at (E) in FIG. 7, the AND gate 86 is enabled to pass the true index pulses on to the OR gate 90 and hence to the index input h of the host controller 20, as indicated at (F) in FIG. 7.

Upon delivery of the true index pulse at the moment t1 to the host controller 20, the write gate signal from its output i goes high as at (G) in FIG. 7. When the write gate signal is high, the third AND gate 94 of the double capacity adapter circuit 16 is enabled to pass the pseudo index pulses from the delay circuit 80. Therefore, as shown at (F) in FIG. 7, the pseudo index pulse that has been generated at the moment t2 is also fed to the index input h of the host controller 20 via the OR gate 24. It will be noted that the second AND gate 92 is now disabled by the low state of the side select signal from the host controller output g, blocking the passage of the pseudo index pulses from the delay circuit 80.

The host controller 20 responds to the trailing edge of the incoming pseudo index pulse by making the write gate signal go low at a moment t3, as at (G) in FIG. 7. The write gate signal is fed via the NOT circuit 98 to the read/write circuit 54 of the first LCFDD 22, enabling the same for the writing of the format data on the magnetic disk 24. During the period from moment t1 to moment t3, when the write gate signal is high, the host controller 20 will deliver from its write output b the set of format data that has been programmed to be written on Side 0 of the first small capacity magnetic disk 36 of the prior art system 26. Being clocked by the double frequency clock 21, the host controller 20 will deliver the format data at the rate of 500 kilobits per second, twice the rate at which the format data have been intended to be written on one side of the small capacity magnetic disk 36. The format data will be written on the first half 100, FIG. 3, of Side 0 of the first large capacity magnetic disk 24, as shown in detail in FIG. 5. Ideally, the writing of the format data will begin at the moment t1 and, after half a revolution of the magnetic disk 24, will end at the moment t2, even though the write gate signal remains high until the slightly later moment t3.

We have said that the second AND gate 92 of the double capacity adapter circuit 16 blocks the passage of the pseudo index pulses therethrough when the side select signal from the host controller output g is low, as before a moment t5 in FIG. 7. Therefore, during such a period, the pseudo index pulses are fed through the third AND gate 94 to the host controller 20 only when the write gate signal is high. The true index pulses, on the other hand, are free to pass through the first AND gate 86 on to the host controller 20 when the side select signal is low. As indicated at (F) in FIG. 7, the host controller 20 inputs one true index pulse at a moment t4 after the writer gate signal has gone low at the moment t3.

Next comes the formatting of the second half 102, FIG. 3, of Side 0 of the first large capacity floppy disk 24. The side select signal from the terminal of the host controller goes high at the moment t5, as shown at (E) in FIG. 7, in accordance with the program for formatting Side 1 of the first small capacity floppy disk 36 of the prior art system 26. Inverted by the NOT circuit 88, the side select signal disables the first AND gate 86 of the double capacity adapter circuit 16 from passing the true index pulses therethrough. However, being fed directly to the second AND gate 92, the side select signal enables this AND gate to pass the pseudo index pulses from the delay circuit 80 on to the index input h of the host controller 20. The host controller 20 responds to the pseudo index pulses just as it does to the true index pulses.

Thus, in response to a pseudo index pulse incoming at a moment t6 as at (F) in FIG. 7, the write gate terminal i of the host controller 20 will go high at the same moment, as indicated at (G) in FIG. 7. Thereupon the third AND gate 94 of the double capacity adapter circuit 16 becomes able to pass the true index pulses on to the host controller input h. Accordingly, as a true index pulse is generated at a moment t7, as at (A) in FIG. 7, which moment is 100 milliseconds after the moment t6, this pulse is admitted to the index input H of the host controller 20 as at (F) in FIG. 7. The write gate terminal i of the host controller 20 will go low at a slightly later moment t8, when the true index pulse disappears.

During the period from moment t6 to moment t8, when the write gate signal is high as at (G) in FIG. 7, the write data output b of the host controller 20 will put out, at the rate of 500 killobits per second, the format data that have been programmed to be written on Side 1 of the low capacity floppy disk 36 of the prior art system 26. Since Side 0 of the first large capacity floppy disk 24 is now chosen by the output from the third NOR gate 74 of the double capacity adapter circuit 16, the format data will be written on the second half 102, FIG. 3, of Side 0 of the disk during the 100 milliseconds period following the moment t6.

Side 1 of the first large capacity floppy disk 24 is formatted in a like manner. In this case, however, the second drive select output d of the host controller 20 goes high, and the other three drive select outputs c, e and f low, in accordance with the conventional program for formatting the second small capacity floppy disk 38 of the prior art system 26. The read/write circuit 54 of the first LCFDD 22 becomes operative as the first NOR gate 70 of the double capacity adapter circuit 16 goes low in response to the high state of the second drive select signal. Further, since the third NOR gate 74 also goes low in response to the high state of the second drive select signal, the read/write circuit 54 is enabled to write the incoming format data on Side 1 of the disk 24 via the upper magnetic head 50. The format data that have been programmed to be written on Side 0 of the second small capacity floppy disk 38 of the prior art system 26 will be written on the first half 104, FIG. 4, of Side 1 of the first large capacity floppy disk 24 when the side select output g of the host controller 20 is low. The format data that have been programmed to be written on Side 1 of the second small capacity floppy disk 38 of the prior art system 26 will be written on the second half 106 of Side 1 of the first large capacity floppy disk 24 when the side select output g of the host controller 20 is high.

For formatting Side 0 of the second large capacity floppy disk 24', the third drive select output e of the host controller 20 goes high, and the other three drive select outputs c, d and f low, in accordance with the conventional program for formatting both sides of the third small capacity floppy disk 40 of the prior art system 26. The read/write circuit 54' of the second LCFDD 22' becomes operative as the second NOR gate 72 of the double capacity adapter circuit 16 goes low in response to the high state of the third drive select signal. The output from the third NOR gate 74 is now high, so that the read/write circuit 54' is enabled to write the incoming format data on Side 0 of the disk 24' via the lower magnetic head 48'. The format data that have been programmed to be written on Side 0 of the third small capacity floppy disk 40 of the prior art system 26 will be written on the first half of Side 0 of the second large capacity floppy disk 24' when the side select output g of the host controller 20 is low. The format data that have been programmed to be written on Side 1 of the third small capacity floppy disk 40 of the prior art system 26 will be written on the second half of Side 0 of the second large capacity floppy disk 24' when the side select output g of the host controller 20 is high.

Similarly, for formatting Side 1 of the second large capacity floppy disk 24', the fourth drive select output f of the host controller 20 goes high, and the other three drive select outputs c, d and e low, in accordance with the conventional program for formatting both sides of the fourth small capacity floppy disk 42 of the prior art system 26. The read/write circuit 54' of the second LCFDD 22' becomes operative as the second NOR gate 72 of the double capacity adapter circuit 16 goes low in response to the high state of the fourth drive select signal. The output from the third NOR gate 74 is now low, so that the read/write circuit 54' is enabled to write the informing format data on Side 1 of the disk 24' via the upper magnetic head 50'. The format data that have been programmed to be written on Side 0 of the fourth small capacity floppy disk 42 of the prior art system 26 will be written on the first half of Side 1 of the second large capacity floppy disk 24' when the side select output g of the host controller 20 is low. The format data that have been programmed to be written on Side 1 of the fourth small capacity floppy disk 42 of the prior art system 26 will be written on the second half of Side 1 of the second large capacity floppy disk 24' when the side select output g of the host controller 20 is high.

We have now completed the formatting of the two double sided large capacity magnetic disks 24 and 24' of the inventive system 10 with use of the same program as for formatting the four double sided small capacity magnetic disks 36 through 42 of the prior art system 26. During the subsequent normal data transfer operation of the inventive system 10, the individual data sectors on each side of each disk can be identified from the prewritten data in their ID fields 116, FIG. 6, so that only one true index pulse is required for each track.

Possible Modifications

Notwithstanding the foregoing detailed disclosure of the representative data processin apparatus, the format written on each disk, and method of operation, we do not wish our invention to be limited by the exact details of such disclosure. The following is a brief list of possible modifications of the above disclosed method and apparatus that we believe fall within the scope of our invention:

1. Only one, instead of two or more, LCFDD may be coupled to the host equipment via the double capacity adapter circuit.

2. The single LCFDD coupled to the host equipment may be of the type for use with a single sided magnetic disk. (In its simplest form, therefore, our invention may be applied to the formatting of one single sided large capacity magnetic disk with the format data that have been programmed to be written on both sides of a double sided small capacity magnetic disk.)

3. In cases where two or more LCFDDs are coupled to the host equipment as in the illustrated embodiment, the large capacity magnetic disks may be formatted in various orders other than the one set forth herein, as dictated by the programs of the host equipment. For instance, the first halves of Side 0 of the first and second disks may first be formatted sequentially, followed by the formatting of the second halves of the same sides. Then the first and second halves of Side 1 of the first and second disks may be formatted in the same order.

4. The true index pulses may be generated by detecting any suitable index mark formed on a part rotating with the magnetic disk, instead of the index hole formed in the disk itself; therefore, our invention may be applied to the formatting of so called "microfloppy" disks described and claimed in Takahashi U.S. Pat. No. 4,445,157.

5. The various interface signals put out by the host equipment may be of "negative" logic form, the double capacity adapter circuit being readily adaptable for such signals.

6. The NAND gates 66 and 66' of the index sensor circuits 56 and 56' may be omitted where the disk drive motors 44 and 44' are driven selectively.

7. The invention may be applied to the formatting of magnetic disks not by IBM specifications but by, for example, International Organization for Standardization specifications.

We claim:

1. A method of formatting one side of a larger capacity magnetic disk with use of the same program as for formatting both sides of a smaller capacity magnetic disk whose data storage capacity per side is half that of the larger capacity magnetic disk, which method comprises:

(a) providing host means programmed for formatting, at a first data transfer speed, one side of the smaller capacity magnetic disk with first format data in response to an incoming index pulse, and the other side of the smaller capacity magnetic disk with second format data in response to another incoming index pulse;

(b) providing a disk drive for data transfer with the larger capacity magnetic disk at a second data transfer speed which is twice as high as the first data transfer speed, with the host means being adapted for controlling the data transfer between the disk drive and the larger capacity magnetic disk at the second data transfer speed;

(c) providing means in the disk drive for generating, for delivery to the host means, a series of true index pulses indicative of the angular position of the larger capacity magnetic disk, the true index pulses being generated at a rate of one with each revolution of the larger capacity magnetic disk;

(d) setting the larger capacity magnetic disk into rotation in the disk drive, with the consequent production of the true index pulses;

(e) generating, for delivery to the host means, a series of pseudo index pulses at the same repetition frequency as the true index pulses, each pseudo index pulse being generated at the moment the larger capacity magnetic disk rotates half a revolution from the moment one true index pulse is generated;

(f) causing the disk drive to write the first format data on a first half of one side of the larger capacity magnetic disk under the control of the host means upon delivery of one true index pulse thereto; and (g) causing the disk drive to write the second format data on a second half of the same side of the larger capacity magnetic disk under the control of the host means upon delivery of one pseudo index pulse thereto.

2. The formatting method of claim 1 wherein the pseudo index pulses are derived from the true index pulses.

3. A method of formatting a double sided larger capacity magnetic disk with use of the same program as for formatting first and second double sided smaller capacity magnetic disks each having a data storage capacity that is half that of the larger capacity magnetic disk, which method comprises:

(a) providing host means programmed for formatting, at a first data transfer speed, first and second sides of the first double sided smaller capacity magnetic disk with first and second format data, respectively, and first and second sides of the second double sided smaller capacity magnetic disk with third and fourth format data, respectively, all in response to incoming index pulses, the host means being further programmed for generating first and second drive select signals during the formatting of the first and second double sided smaller capacity magnetic disks, respectively;

(b) providing a disk drive for data transfer with the double sided larger capacity magnetic disk at a second data transfer speed which is twice as high as the first data transfer speed, with the host means being adapted for controlling the data transfer between the disk drive and the larger capacity magnetic disk at the second data transfer speed;

(c) providing means in the disk drive for generating, for delivery to the host means, a series of true index pulses indicative of the angular position of the larger capacity magnetic disk, the true index pulses being generated at a rate of one with each revolution of the larger capacity magnetic disk;

(d) setting the larger capacity magnetic disk into rotation in the disk drive, with the consequent production of the true index pulses;

(e) generating, for delivery to the host means, a series of pseudo index pulses at the same repetition frequency as the true index pulses, each pseudo index pulse being generated at the moment the larger capacity magnetic disk rotates half a revolution from the moment one true index pulse is generated;

(f) causing the disk drive to write the first format data on a first half of a first side of the larger capacity magnetic disk in response to the first drive select signal under the control of the host means upon delivery of one true index pulse thereto;

(g) causing the disk drive to write the second format data on a second half of the first side of the larger capacity magnetic disk in response to the first drive select signal under the control of the host means upon delivery of one pseudo index pulse thereto;

(h) causing the disk drive to write the third format data on a first half of a second side of the larger capacity magnetic disk in response to the second drive select signal under the control of the host means upon delivery of one true index pulse thereto; and (i) causing the disk drive to write the fourth format data on a second half of the second side of the larger capacity magnetic disk in response to the second drive select signal under the control of the host means upon delivery of one pseudo index pulse thereto.

4. A method of formatting first and second double sided larger capacity magnetic disk with use of the same program as for formatting first, second, third and fourth double sided smaller capacity magnetic disks each having a data storage capacity that is half that of each larger capacity magnetic disk, which method comprises:

(a) providing host means programmed for formatting, at a first data transfer speed, first and second sides of the first smaller capacity magnetic disk with first and second format data, respectively, first and second sides of the second smaller capacity magnetic disk with third and fourth format data, respectively, first and second sides of the third smaller capacity magnetic disk with fifth and sixth format data, respectively, and first and second sides of the fourth smaller capacity magnetic disk with seventh and eighth format data, respectively, all in response to incoming index pulses, the host means being further programmed to generate first, second, third and fourth drive select signals during the formatting of the first, second, third and fourth smaller capacity magnetic disks, respectively;

(b) providing first and second disk drives for data transfer with the first and second double sided larger capacity magnetic disks, respectively, at a second data transfer speed which is twice as high as the first data transfer speed, with the host means being adapted for controlling the data transfer between the first and second disk drives and the first and second larger capacity magnetic disks at the second data transfer speed;

(c) providing first and second index means in the first and second disk drives for generating, for delivery to the host means, first and second series of true index pulses indicative of the angular positions of the first and second larger capacity magnetic disks, respectively, each series of true index pulses being generated at a rate of one with each revolution of the associated larger capacity magnetic disk;

(d) setting the first larger capacity magnetic disk into rotation in the first disk drive, with the consequent production of the first series of true index pulses by the first index means;

(e) generating, for delivery to the host means, a first series of pseudo index pulses at the same repetition frequency as the first series of true index pulses, each pseudo index pulse being generated at the moment the first larger capacity magnetic disk rotates half a revolution from the moment one of the first series of true index pulses is generated;

(f) causing the first disk drive to write the first format data on a first half of a first side of the first larger capacity magnetic disk in response to the first drive select signal under the control of the host means upon delivery of one of the first series of true index pulses thereto;

(g) causing the first disk drive to write the second format data on a second half of the first side of the first larger capacity magnetic disk in response to the first drive select signal under the control of the host means upon delivery of one of the first series of pseudo index pulses thereto;

(h) causing the first disk drive to write the third format data on a first half of a second side of the first larger capacity magnetic disk in response to the second drive select signal under the control of the host means upon delivery of one of the first series of true index pulses thereto;

(i) causing the first disk drive to write the fourth format data on a second half of the second side of the first larger capacity magnetic disk in response to the second drive select signal under the control of the host means upon delivery of one of the first series of pseudo index pulses thereto;

(j) setting the second larger capacity magnetic disk into rotation in the second disk drive, with the consequent production of the second series of true index pulses by the second index means;

(k) generating, for delivery to the host means, a second series of pseudo index pulses at the same repetition frequency as the second series of true index pulses, the second series of pseudo index pulses being each generated at the moment the second larger capacity magnetic disk rotates half a revolution from the moment one of the second series of true index pulses is generated;

(l) causing the second disk drive to write the fifth format data on a first half of a first side of the second larger capacity magnetic disk in response to the third drive select signal under the control of the host means upon delivery of one of the second series of true index pulses thereto;

(m) causing the second disk drive to write the sixth format data on a second half of the first side of the second larger capacity magnetic disk in response to the third drive select signal under the control of the host means upon delivery of one of the second series of pseudo index pulses thereto;

(n) causing the second disk drive to write the seventh format data on a first half of a second side of the second larger capacity magnetic disk in response to the fourth drive select signal under the control of the host means upon delivery of one of the second series of true index pulses thereto; and (o) causing the second disk drive to write the eighth format data on a second half of the second side of the second larger capacity magnetic disk in response to the fourth drive select signal under the control of the host means upon delivery of one of the second series of pseudo index pulses thereto.

5. A data transfer system capable of formatting one side of a larger capacity magnetic disk with use of the same program as for formatting both sides of a smaller capacity magnetic disk whose data storage capacity per side is half that of the larger capacity magnetic disk, the data transfer system comprising:

(a) host means programmed for formatting, at a first data transfer speed, one side of the smaller capacity magnetic disk with first format data in response to an incoming index pulse, and the other side of the smaller capacity magnetic disk with second format data in response to another incoming index pulse;

(b) a disk drive for data transfer with the larger capacity magnetic disk at a second data transfer speed which is twice as high as the first data transfer speed, with the host means being adapted for controlling the data transfer between the disk drive and the larger capacity magnetic disk at the second data transfer speed;

(c) index sensor means in the disk drive for producing, for delivery to the host means, a series of true index pulses indicative of the angular position of the larger capacity magnetic disk, the true index pulses being generated one with each revolution of the larger capacity magnetic disk;

(d) a double capacity adapter circuit connected between the host means and the disk drive and including pseudo index pulse generator means for generating, for delivery to the host means, a series of pseudo index pulses at the same repetition frequency as the true index pulses, each pseudo index pulse being generated at the moment the larger capacity magnetic disk rotates half a revolution from the moment one true index pulse is generated; and (e) means in the double capacity adapter circuit for enabling the host means to cause the disk drive to write the first format data on a first half of one side of the larger capacity magnetic disk in response to one true index pulse, and the second format data on a second half of the same side of the larger capacity magnetic disk in response to one pseudo index pulse.

6. The data transfer system of claim 5 wherein the pseudo index pulse generator means of the double capacity adapter circuit comprises a delay circuit coupled to the index sensor means of the disk drive for producing the pseudo index pulses by imparting a prescribed time delay to the true index pulse.

7. A data transfer system capable of formatting a double sided larger capacity magnetic disk with use of the same program as for formatting first and second double sided smaller capacity magnetic disks each having a data storage capacity that is half that of the larger capacity magnetic disk, the data transfer system comprising:

(a) host means programmed for formatting, at a first data transfer speed, first and second sides of the first smaller capacity magnetic disk with first and second format data, respectively, and first and second sides of the second smaller capacity magnetic disk with third and fourth format data, respectively, all in response to incoming index pulses, the host means being further programmed for generating first and second drive select signals during the formatting of the first and second smaller capacity magnetic disks, respectively;

(b) a disk drive for data transfer with the opposite sides of the larger capacity magnetic disk at a second data transfer speed which is twice as high as the first data transfer speed, with the host means being adapted for controlling the data transfer between the disk drive and the larger capacity magnetic disk at the second data transfer speed;

(c) index sensor means in the disk drive for producing, for delivery to the host means, a series of true index pulses indicative of the angular position of the larger capacity magnetic disk, the true index pulses being generated one with each revolution of the larger capacity magnetic disk;

(d) a double capacity adapter circuit connected between the host means and the disk drive and including pseudo index pulse generator means for generating, for delivery to the host means, a series of pseudo index pulses at the same repetition frequency as the true index pulses, each pseudo index pulse being generated at the moment the larger capacity magnetic disk rotates half a revolution from the moment one true index pulse is generated; and (e) means in the double capacity adapter circuit for enabling the host means to cause the disk drive to write the first format data on a first half of a first side of the larger capacity magnetic disk in response to the first drive select signal upon delivery of one true index pulse to the host means, further for enabling the host means to cause the disk drive to write the second format data on a second half of the first side of the larger capacity magnetic disk in response to the first drive select signal upon delivery of one pseudo index pulse to the host means, further for enabling the host means to cause the disk drive to write the third format data on a first half of a second side of the larger capacity magnetic disk in response to the second drive select signal upon delivery of one true index pulse to the host means, and for further enabling the host means to cause the disk drive to write the fourth format data on a second half of the second side of the larger capacity magnetic disk in response to the second drive select signal upon delivery of one pseudo index pulse to the host means.

8. A data transfer system capable of formatting first and second double sided larger capacity magnetic disk with use of the same program as for formatting first, second, third and fourth double sided smaller capacity magnetic disks each having a data storage capacity that is half that of the larger capacity magnetic disk, the data transfer system comprising:

(a) host means programmed for formatting, at a first data transfer speed, first and second sides of the first smaller capacity magnetic disk with first and second format data, respectively, first and second sides of the second smaller capacity magnetic disk with third and fourth format data, respectively, first and second sides of the third smaller capacity magnetic disk with fifth and sixth format data, respectively, and first and second sides of the fourth smaller capacity magnetic disk with seventh and eighth format data, respectively, all in response to incoming index pulses, the host means being further programmed for generating first, second, third and fourth drive select signals during the formatting of the first, second, third and fourth smaller capacity magnetic disks, respectively;

(b) first and second disk drives for data transfer with the opposite sides of the first and second larger capacity magnetic disks, respectively, at a second data transfer speed which is twice as high as the first data transfer speed, with the host means being adapted for controlling the data transfer between the first and second disk drives and the first and second larger capacity magnetic disk at the second data transfer speed;

(c) first and second index sensor means in the first and second disk drives for generating, for delivery to the host means, first and second series of true index pulses indicative of the angular positions of the first and second larger capacity magnetic disks, respectively, each series of true index pulses being generated at a rate of one with each revolution of the associated larger capacity magnetic disk;

(d) a double capacity adapter circuit connected between the host means and the first and second disk drives and including pseudo index pulse generator means for generating, for delivery to the host means, first and second series of pseudo index pulses at the same repetition frequencies as the first and second series of true index pulses, respectively, each of the first series of pseudo index pulses being generated at the moment the first larger capacity magnetic disk rotates half a revolution from the moment one of the first series of true index pulses is generated by the first index sensor means, each of the second series of pseudo index pulses being generated at the moment the second larger capacity magnetic disk rotates half a revolution from the moment one of the second series of true index pulses is generated; and (e) means in the double capacity adapter circuit for enabling the host means to cause the first disk drive to write the first format data on a first half of a first side of the first larger capacity magnetic disk in response to the first drive select signal upon delivery of one true index pulse to the host means, further for enabling the host means to cause the first disk drive to write the second format data on a second half of the first side of the first larger capacity magnetic disk in response to the first drive select signal upon delivery of one pseudo index pulse to the host means, further for enabling the host means to cause the first disk drive to write the third format data on a first half of a second side of the first larger capacity magnetic disk in response to the second drive select signal upon delivery of one true index pulse to the host means, further for enabling the host means to cause the first disk drive to write the fourth format data on a second half of the second side of the first larger capacity magnetic disk in response to the second drive select signal upon delivery of one pseudo index pulse to the host means, further for enabling the host means to cause the second disk drive to write the fifth format data on a first half of a first side of the second larger capacity magnetic disk in response to the third drive select signal upon delivery of one true index pulse to the host means, further for enabling the host means to cause the second disk drive to write the sixth format data on a second half of the first side of the second larger capacity magnetic disk in response to the third drive select signal upon delivery of one pseudo index pulse to the host means, further for enabling the host means to cause the second disk drive to write the seventh format data on a first half of a second side of the second larger capacity magnetic disk in response to the fourth drive select signal upon delivery of one true index pulse to the host means, and further for enabling the host means to cause the second disk drive to write the eighth format data on a second half of the second side of the second larger capacity magnetic disk in response to the fourth drive select signal upon delivery of one pseudo index pulse to the host means.

9. The data tranfer system of claim 8 wherein the pseudo index pulse generator means of the double capacity adapter circuit comprises a delay circuit coupled to both of the first and second index sensor means of the first and second disk drives for producing the first and second series of pseudo index pulses by imparting a prescribed time delay to the first and second series of true index pulses, respectively.

* * * * *